United States Patent
Geng et al.

(10) Patent No.: US 12,015,873 B1
(45) Date of Patent: Jun. 18, 2024

(54) IMAGE TRANSMISSION DEVICE AND CONTROL METHOD THEREOF, IMAGE TRANSMISSION SYSTEM AND DISPLAY APPARATUS

(71) Applicant: BOE TECHNOLOGY GROUP CO., LTD., Beijing (CN)

(72) Inventors: Lihua Geng, Beijing (CN); Xitong Ma, Beijing (CN); Ran Duan, Beijing (CN); Xiaodong Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/638,098

(22) PCT Filed: Jan. 5, 2021

(86) PCT No.: PCT/CN2021/070367
§ 371 (c)(1),
(2) Date: Feb. 24, 2022

(87) PCT Pub. No.: WO2022/147666
PCT Pub. Date: Jul. 14, 2022

(51) Int. Cl.
*H04N 7/01* (2006.01)

(52) U.S. Cl.
CPC ................ *H04N 7/0127* (2013.01)

(58) Field of Classification Search
CPC .... H04N 7/01; H04N 1/00127; H04N 7/0127; H04N 7/0132
USPC .................. 348/441, 449, 458, 459
See application file for complete search history.

(56) References Cited

U.S. PATENT DOCUMENTS

| | | | |
|---|---|---|---|
| 7,023,485 B1 * | 4/2006 | Sohn | H04N 21/4305 348/E5.111 |
| 2009/0161809 A1 | 6/2009 | Xiu et al. | |
| 2012/0063534 A1 | 3/2012 | Lin et al. | |
| 2017/0248987 A1 | 8/2017 | Tsao et al. | |

FOREIGN PATENT DOCUMENTS

| | | |
|---|---|---|
| CN | 102122498 A | 7/2011 |
| CN | 102446483 A | 5/2012 |
| CN | 104345770 A | 2/2015 |
| EP | 0913053 B1 | 6/2011 |

* cited by examiner

*Primary Examiner* — Sherrie Hsia
(74) *Attorney, Agent, or Firm* — IP & T GROUP LLP

(57) ABSTRACT

An image transmission device includes: a frequency detector configured to detect a frame rate of an image frame and output a frequency switching mark signal when detecting that the frame rate changes; a frequency configuration device configured to output a first configuration signal according to a safe frequency step value in response to the frequency switching mark signal; a frequency processor configured to output a reference clock signal, adjust a frequency of the output reference clock signal repeatedly according to the first configuration signal, and until a frequency of an adjusted reference clock signal is substantially equal to a frequency of a reference clock signal corresponding to a changed frame rate, end adjustment; and an image frame transmitter configured to convert a format of the image frame into a format corresponding to the image frame transmitter according to the adjusted reference clock signal, and output the format-converted image frame.

20 Claims, 6 Drawing Sheets

IMAGE TRANSMISSION DEVICE AND CONTROL METHOD THEREOF, IMAGE TRANSMISSION SYSTEM AND DISPLAY APPARATUS

CROSS-REFERENCE TO RELATED APPLICATION

This application is a national phase entry under 35 USC 371 of International Patent Application No. PCT/CN2021/070367, filed on Jan. 5, 2021, which is incorporated herein by reference in its entirety.

TECHNICAL FIELD

The present disclosure relates to the field of display technologies, and in particular, to an image transmission device and a control method thereof, an image transmission system, and a display apparatus.

BACKGROUND

A display apparatus includes an image transmission device and a display module. The image transmission device receives video signals from outside, converts the video signals into image frames, and transmits the image frames to the display module, so that the display module displays images.

A V-by-One (VBO) protocol is a general protocol applicable to transmitting the image frames between the image transmission device and the display module. The image transmission device and the display module are coupled through VBO interfaces to realize transmission of the image frames.

SUMMARY

In an aspect, an image transmission device is provided, including a frequency detector, a frequency configuration device, a frequency processor, and an image frame transmitter.

The frequency detector is configured to receive an image frame, detect a frame rate of the image frame, and output a frequency switching mark signal when it is detected that the frame rate changes.

The frequency configuration device is coupled to the frequency detector, and configured to output a first configuration signal according to a safe frequency step value in response to the frequency switching mark signal from the frequency detector.

The frequency processor is coupled to the frequency configuration device, and configured to output a reference clock signal, adjust a frequency of the output reference clock signal repeatedly according to the first configuration signal from the frequency configuration device, each adjustment value being less than or equal to the safe frequency step value, and until a frequency of an adjusted reference clock signal is substantially equal to a frequency of a reference clock signal corresponding to a changed frame rate of the image frame, end adjustment.

The image frame transmitter is coupled to the frequency processor, and configured to receive the image frame and the adjusted reference clock signal that is from the frequency processor, convert a format of the image frame into a format corresponding to the image frame transmitter according to the adjusted reference clock signal, and output the format-converted image frame.

In some embodiments, the image transmission device further includes a frequency step determining device. The frequency step determining device is coupled to the frequency configuration device, and configured to: in a safe step determining process, determine the safe frequency step value according to a locking signal for indicating that the image frame transmitter and an image frame receiver are in a locked state, and output the safe frequency step value to the frequency configuration device.

In some embodiments, the frequency configuration device is configured to receive the safe frequency step value from the frequency step determining device in response to the frequency switching mark signal from the frequency detector, generate the first configuration signal according to the safe frequency step value, and output the first configuration signal.

In some embodiments, the frequency step determining device includes a first determining circuit, a step value adjusting circuit, an output circuit, and a calculation circuit.

The output circuit is configured to output a frequency step value.

The first determining circuit is configured to: determine whether the locked state between the image frame transmitter and the image frame receiver changes according to the locking signal; determine whether to adjust the frequency step value currently output by the output circuit according to whether the locked state changes; and if it is determined that the frequency step value currently output by the output circuit is to be adjusted, output an adjustment instruction signal to the step value adjusting circuit.

The step value adjusting circuit is configured to receive the adjustment instruction signal from the first determining circuit, adjust the frequency step value currently output by the output circuit according to the adjustment instruction signal, and output an adjusted frequency step value to the output circuit.

The output circuit is further configured to receive the adjusted frequency step value from the step value adjusting circuit, and output the adjusted frequency step value to the frequency configuration device.

The first determining circuit is further configured to: determine whether the locked state between the image frame transmitter and the image frame receiver changes after the frequency step value currently output by the output circuit is adjusted, according to the locking signal; continue to determine whether to adjust the adjusted frequency step value output by the output circuit; and until it is determined that an adjusted frequency step value currently output by the output circuit is not to be adjusted, output a calculation instruction signal to the calculation circuit.

The calculation circuit is configured to obtain the safe frequency step value through calculation according to the adjusted frequency step value currently output by the output circuit in response to the calculation instruction signal from the first determining circuit.

In some embodiments, the frequency configuration device is further configured to: in the safe step determining process, receive a frequency step value from the output circuit of the frequency step determining device, generate a second configuration signal according to the frequency step value from the output circuit, and output the second configuration signal.

The frequency processor is further configured to receive the second configuration signal from the frequency configuration device, adjust a frequency of a reference clock signal currently output according to the frequency step value contained in the second configuration signal, and output a reference clock signal with an adjusted frequency.

In some embodiments, the frequency configuration device includes a second determining circuit and an adjustment strategy circuit.

The second determining circuit is configured to calculate a difference value between a frequency of a reference clock signal corresponding to a frame rate of the image frame before change and a frequency of a reference clock signal corresponding to a frame rate of the image frame after change in response to the frequency switching mark signal, and determine whether the difference value is an integer multiple of the safe frequency step value.

The adjustment strategy circuit is configured to: if it is determined that the difference value is the integer multiple of the safe frequency step value, output the first configuration signal containing the safe frequency step value and a first number of adjustments, the first number of adjustments being equal to a quotient of the difference value divided by the safe frequency step value; and if it is determined that the difference value is not the integer multiple of the safe frequency step value, output the first configuration signal containing the safe frequency step value, a second number of adjustments and a remainder step value, the second number of adjustments being equal to the quotient of the difference value divided by the safe frequency step value, and the remainder step value being equal to a remainder of the difference value divided by the safe frequency step value.

In some embodiments, the frequency processor is configured to: if it is determined that the difference value is the integer multiple of the safe frequency step value, adjust the frequency of the output reference clock signal for the first number of adjustments according to the first configuration signal containing the safe frequency step value and the first number of adjustments received from the frequency configuration device, each adjustment value being equal to the safe frequency step value; and if it is determined that the difference value is not the integer multiple of the safe frequency step value, adjust the frequency of the output reference clock signal (M+1) times according to the first configuration signal containing the safe frequency step value, the second number of adjustments and the remainder step value received from the frequency configuration device, wherein each adjustment value of M times of adjustments is equal to the safe frequency step value, and an adjustment value of a remaining one adjustment is equal to the remainder step value; and M is equal to the second number of adjustments.

In some embodiments, the image transmission device further includes a video input interface, an image buffer, and an image converter.

The video input interface is configured to receive a video signal from outside and convert the received video signal into an image frame.

The image buffer is coupled to the video input interface, and configured to: receive the image frame from the video input interface and buffer the image frame received from the video input interface; and adjust a frame rate of the buffered image frame to correspond to a frequency of a reference clock signal currently output by the frequency processor in a process in which the frequency processor adjusts the frequency of the output reference clock signal repeatedly.

The image converter is coupled to the image buffer and the image frame transmitter, and configured to receive the image frame from the image buffer, perform an image processing on the image frame received from the video input interface, and output an image frame that is obtained after the image processing to the image frame transmitter.

In another aspect, an image transmission system is provided, including an image frame receiver and the image transmission device described in any of the above embodiments. The image frame receiver is configured to establish a transmission link with the image frame transmitter in the image transmission device, receive the format-converted image frame output by the image frame transmitter, and output a locking signal for indicating that the image frame receiver and the image frame transmitter are in a locked state.

In yet another aspect, a display device is provided, including the image transmission system described in the above embodiments.

In some embodiments, the display device includes a display module and a system board. The display module includes a display screen and a control circuit board coupled to the display screen. The system board is coupled to the control circuit board. The image transmission device in the image transmission system is disposed in the system board, and the image frame receiver in the image transmission system is disposed in the control circuit board.

In yet another aspect, a control method of an image transmission device is provided, and applied to the image transmission device described in any of the above embodiments. The control method of the image transmission device includes a frequency adjustment process, and the frequency adjustment process includes:

receiving, by the frequency detector, the image frame; detecting, by the frequency detector, the frame rate of the image frame; and outputting, by the frequency detector, the frequency switching mark signal when it is detected that the frame rate changes;

outputting, by the frequency configuration device, the first configuration signal according to the safe frequency step value in response to the frequency switching mark signal from the frequency detector;

outputting, by the frequency processor, the reference clock signal; adjusting, by the frequency processor, the frequency of the output reference clock signal repeatedly according to the first configuration signal from the frequency configuration device, each adjustment value being less than or equal to the safe frequency step value, and until the frequency of the adjusted reference clock signal is equal to the frequency of the reference clock signal corresponding to the changed frame rate of the image frame, ending the adjustment; and receiving, by the image frame transmitter, the image frame and the adjusted reference clock signal from the frequency processor; converting, by the image frame transmitter, the format of the image frame into the format corresponding to the image frame transmitter according to the adjusted reference clock signal; and outputting, by the image frame transmitter, the format-converted image frame.

In some embodiments, the image transmission device further includes a frequency step determining device, the control method further includes a safe step determining process, and the safe step determining process includes:

determining, by the frequency step determining device, the safe frequency step value according to a locking signal for indicating that the image frame transmitter and an image frame receiver are in a locked state.

In some embodiments, determining, by the frequency step determining device, the safe frequency step value according to the locking signal for indicating that the image frame transmitter and the image frame receiver are in the locked state includes:

outputting, by the frequency step determining device, a frequency step value to the frequency configuration device;

receiving, by the frequency configuration device, the frequency step value; generating, by the frequency configuration device, a second configuration signal according to the frequency step value; and outputting, by the frequency configurator, the second configuration signal;

receiving, by the frequency processor, the second configuration signal from the frequency configuration device; adjusting, by the frequency processor, a frequency of a reference clock signal currently output according to the frequency step value contained in the second configuration signal; and outputting, by the frequency processor, a reference clock signal with an adjusted frequency;

determining, by the frequency step determining device, whether the locked state between the image frame transmitter and the image frame receiver changes according to the locking signal sent by the image frame receiver to the image frame transmitter;

if it is determined that the locked state does not change, increasing, by the frequency step determining device, the frequency step value currently output; continuing to determine, by the frequency step determining device, whether the locked state changes; and until it is determined that the locked state is lost, determining, by the frequency step determining device, a frequency step value currently output as a critical frequency step value;

if it is determined that the locked state changes to a state in which the locked state is lost, reducing, by the frequency step determining device, the frequency step value currently output; continuing to determine, by the frequency step determining device, whether the locked state is restored from an unlocked state; and until it is determined that the locked state is restored from the unlocked state, determining, by the frequency step determining device, a frequency step value currently output as the critical frequency step value; and calculating, by the frequency step determining device, the safe frequency step value according to the critical frequency step value.

In some embodiments, determining, by the frequency step determining device, whether the locked state between the image frame transmitter and the image frame receiver changes according to the locking signal sent by the image frame receiver to the image frame transmitter includes:

if the frequency step determining device receives the locking signal within preset time, it is determined that the image frame transmitter and the image frame receiver are in the locked state, and it is determined that the locked state between the image frame transmitter and the image frame receiver does not change; and if the frequency step determining device does not receive the locking signal within the preset time, it is determined that the locked state between the image frame transmitter and the image frame receiver is changed to the state in which the locked state is lost.

In some embodiments, calculating, by the frequency step determining device, the safe frequency step value according to the critical frequency step value includes:

subtracting, by the frequency step determining device, a preset frequency threshold from the critical frequency step value to obtain the safe frequency step value.

In some embodiments, outputting, by the frequency configuration device, the first configuration signal according to the safe frequency step value in response to the frequency switching mark signal from the frequency detector includes:

calculating, by the frequency configuration device, a difference value between a frequency of a reference clock signal corresponding to a frame rate of the image frame before change and a frequency of a reference clock signal corresponding to a frame rate of the image frame after change in response to the frequency switching mark signal; and determining, by the frequency configuration device, whether the difference value is an integer multiple of the safe frequency step value; and if it is determined that the difference value is the integer multiple of the safe frequency step value, outputting, by the frequency configuration device, the first configuration signal containing the safe frequency step value and a first number of adjustments, the first number of adjustments being equal to a quotient of the difference value divided by the safe frequency step value; and if it is determined that difference value is not the integer multiple of the safe frequency step value, outputting, by the frequency configuration device, the first configuration signal containing the safe frequency step value, a second number of adjustments and a remainder step value, the second number of adjustments being equal to a quotient of the difference value divided by the safe frequency step value, and the remainder step value being equal to a remainder of the difference value divided by the safe frequency step value.

Outputting, by the frequency processor, the reference clock signal, and adjusting, by the frequency processor, the frequency of the output reference clock signal repeatedly according to the first configuration signal from the frequency configuration device, each adjustment value being less than or equal to the safe frequency step value, and until the frequency of the output reference clock signal is equal to the frequency of the reference clock signal corresponding to the changed frame rate of the image frame, ending the adjustment includes:

if the difference value is the integer multiple of the safe frequency step value, adjusting, by the frequency processor, the frequency of the output reference clock signal for the first number of adjustments according to the first configuration signal containing the safe frequency step value and the first number of adjustments that is from the frequency configuration device, each adjustment value being equal to the safe frequency step value; and if the difference value is not the integer multiple of the safe frequency step value, adjusting, by the frequency processor, the frequency of the output reference clock signal (M+1) times according to the first configuration signal containing the safe frequency step value, the second number of adjustments and the remainder step value that is from the frequency configuration device, each adjustment value of M times of adjustments in (M+1) times of adjustments being equal to the safe frequency step value, an adjustment value of a remaining one adjustment in (M+1) times of adjustments being equal to the remainder step value, and M being equal to the second number of adjustments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on an actual size of a product, an actual process of a method and an actual timing of a signal involved in the embodiments of the present disclosure.

DETAILED DESCRIPTION

Figure 1:
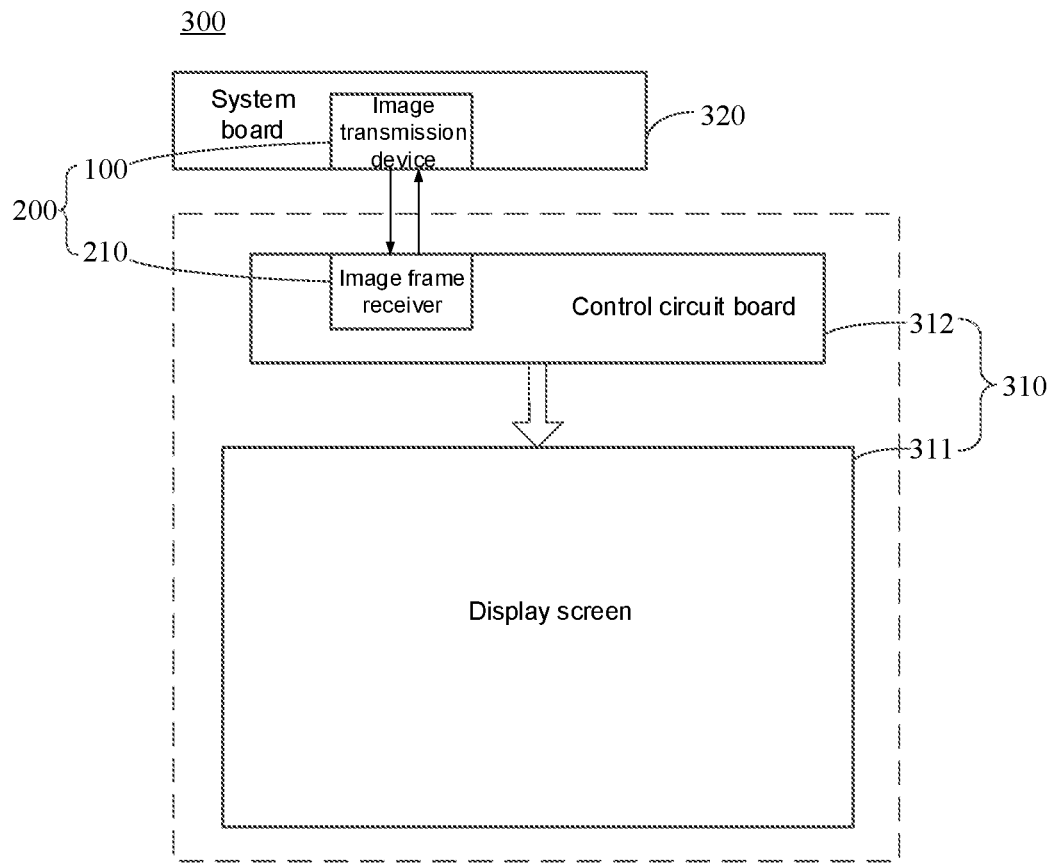
FIG. 1 is a structural diagram of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "substantially" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

As shown in FIG. 1, some embodiments of the present disclosure provide a display apparatus 300, and the display apparatus 300 includes a display module 310 and a system board 320. The display module 310 includes a display screen 311 and a control circuit board 312 coupled to the display screen 311.

The system board 320 is coupled to the control circuit board 312 of the display module 310, and the system board 320 is configured to receive a video signal from outside, convert the video signal into an image frame, transmit the image frame to the control circuit board 312, and provide the control circuit board 312 with some control signals required for an operation of the control circuit board 312.

The control circuit board 312 of the display module 310 is configured to provide the display screen 311 with some signals required for displaying an image according to the image frame from the system board 320. For example, a timing controller (TCON), a power supply circuit (e.g., a direct current to direct current (DC/DC) convertor), a gamma circuit and other components are disposed in the control circuit board 312, which may provide source control signals, power supply signals, gamma voltages and other signals to the display screen 311.

The display apparatus 300 provided in the embodiments of the present disclosure may be any apparatus that displays an image whether in motion (e.g., a video) or stationary (e.g., a static image), and whether literal or graphical. More specifically, it is anticipated that the described embodiments may be implemented in or associated with a variety of electronic devices. The variety of electronic devices may be, for example (but not limited to), mobile phones, wireless devices, personal data assistants (PDAs), hand-held or portable computers, global positioning system (GPS) receivers/navigators, cameras, MPEG-4 Part 14 (MP4) video players, video cameras, game consoles, watches, clocks, calculators, TV monitors, flat-panel displays, computer monitors, automobile displays (e.g., odometer displays), navigators, cockpit controllers and/or displays, camera view displays (e.g., rear view camera displays in vehicles), electronic photos, electronic billboards or signs, projectors, building structures, and packaging and aesthetic structures (e.g., a display for an image of a piece of jewelry).

Figure 2:
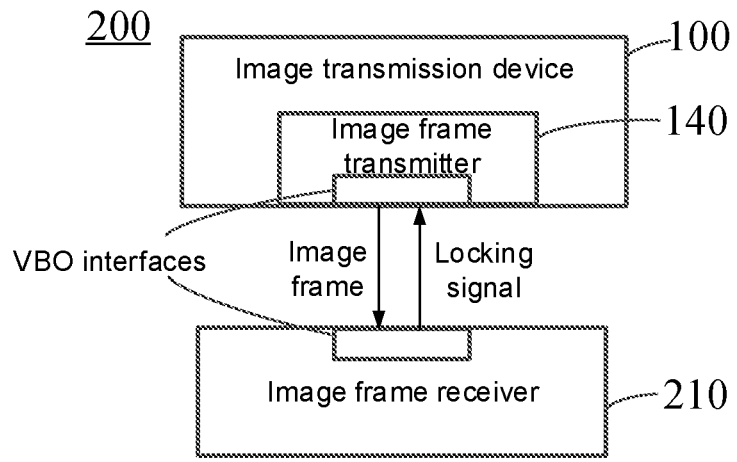
FIG. 2 is a structural diagram of an image transmission system, in accordance with some embodiments.

In some embodiments, as shown in FIGS. 1 and 2, the display apparatus 300 includes an image transmission system 200. The image transmission system 200 includes an image transmission device 100 and an image frame receiver 210, and the image transmission device 100 includes an image frame transmitter 140. The image transmission device 100 is disposed in the system board 320, and the image frame receiver 210 is disposed in the control circuit board 312. The image transmission device 100 is configured to receive the video signal from the outside, convert the received video signal into the image frame, convert a format of the image frame, and output the format-converted image frame through the image frame transmitter 140. Functions of the image transmission device 100 will be described in detail below.

The image frame receiver 210 is configured to establish a transmission link with the image transmission device 100 to receive the format-converted image frame output by the image frame transmitter 140 in the image transmission device 100, and output a locking signal for indicating that the image frame transmitter 140 in the image transmission device 100 and the image frame receiver 210 are in a locked state. That is, in a case where the image frame receiver 210 outputs the lock signal, the image frame transmitter 140 in the image transmission device 100 and the image frame receiver 210 are in the locked state, which indicates that the transmission link is established between the image frame receiver 210 and the image frame transmitter 140 in the image transmission device 100.

It will be noted that, a format of the format-converted image frame output by the image frame transmitter 140 in the image transmission device 100 should conform to a transmission protocol between the image frame transmitter 140 and the image frame receiver 210.

For example, as shown in FIG. 2, the image frame transmitter 140 in the image transmission device 100 and the image frame receiver 210 may be coupled through V-by-One (VBO) interfaces, and the transmission link therebetween is established through the VBO interfaces.

For example, in a case where the transmission link is established between the image frame transmitter 140 in the image transmission device 100 and the image frame receiver 210 through the VBO interfaces, the format of the format-converted image frame output by the image frame transmitter 140 in the image transmission device 100 conforms to a protocol of the VBO interface. In this way, a normal transmission of the image frame between the image frame transmitter 140 and the image frame receiver 210 may be ensured.

In the related art, an image frame transmitter in an image transmission device and an image frame receiver are coupled through VBO interfaces, and the image transmission device further includes a frequency processor coupled to the image frame transmitter. The image frame transmitter receives an image frame and a reference clock signal that is from the frequency processor and corresponds to a frame rate of the image frame, converts a format of the image frame into a format that conforms to a VBO interface protocol according to the reference clock signal, and transmits the format-converted image frame to the image frame receiver, so that the image frame transmitter and the image frame receiver are in a locked state in a case where a transmission link is established between the image frame receiver and the image frame transmitter.

However, under different video signal standards, a video signal has different frame rates. In a case where the frame rate of the video signal changes, the frame rate of the image frame received by the image frame transmitter changes, and correspondingly, a frequency of the reference clock signal corresponding to the frame rate of the image frame also changes. For example, the frame rate of the image frame changes from 60 fps to 60/1.001 fps, and correspondingly, the frequency of the reference clock signal needs to change from 148.5 MHz to 148.35 MHz; and a change value of the frequency of the reference clock signal is: 148.5 MHz−148.35 MHz=0.15 MHz. This sudden change (a great change) in the frequency of the reference clock signal may cause a change in a transmission rate of the transmission link between the image frame transmitter and the image frame receiver, resulting in the transmission link to be disconnected, and a loss of the locked state between the image frame transmitter and the image frame receiver.

Due to the loss of the locked state between the image frame transmitter and the image frame receiver, the image frame cannot be transmitted between the image frame transmitter and the image frame receiver, which causes a display module to display an image according to a built-in self-test (BIST) signal (that is, the display module displays an image with color jumping), and affects a normal display of the display module.

Figure 3:
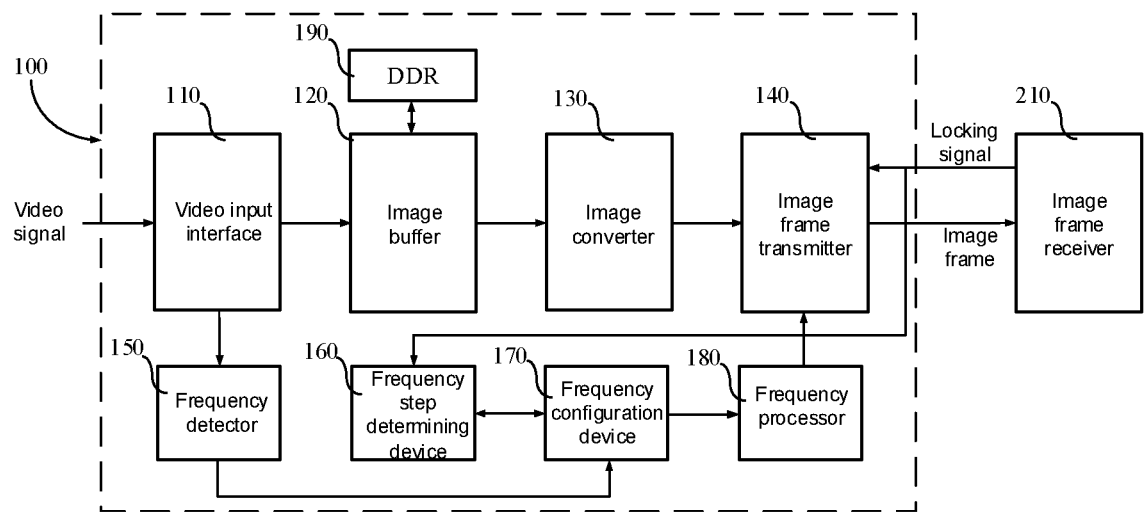
FIG. 3 is a structural diagram of an image transmission device, in accordance with some embodiments.

Based on this, as shown in FIG. 3, the image transmission device 100 provided in some embodiments of the present disclosure includes a frequency detector 150, a frequency configuration device 170, a frequency processor 180, and the image frame transmitter 140.

As shown in FIG. 3, the frequency detector 150 is configured to receive the image frame, detect a frame rate of the image frame, and output a frequency switching mark signal when detecting that the frame rate changes.

It will be noted that, under different video signal standards, a video signal has different frame rates. For example, under different video signal standards, a video signal has the different frame rates of x fps and x/1.001 fps, such as 30 fps and 30/1.001 fps, or 60 fps and 60/1.001 fps.

In a case where the frame rate of the video signal received by the image transmission device 100 changes from x fps to x/1.001 fps, the frequency detector 150 detects that the frame rate of the image frame changes from x fps to x/1.001 fps and outputs the frequency switching mark signal.

For example, in a case where the frame rate of the video signal received by the image transmission device 100 changes from 30 fps to 30/1.001 fps, the frequency detector 150 detects that the frame rate of the image frame changes from 30 fps to 30/1.001 fps and outputs the frequency switching mark signal.

For another example, in a case where the frame rate of the video signal received by the image transmission device 100 changes from 60 fps to 60/1.001 fps, the frequency detector 150 detects that the frame rate of the image frame changes from 60 fps to 60/1.001 fps and outputs the frequency switching mark signal.

In a case where the frame rate of the video signal received by the image transmission device 100 changes from x/1.001 fps to x fps, the frequency detector 150 detects that the frame rate of the image frame changes from x/1.001 fps to x fps and outputs the frequency switching mark signal.

For example, in a case where the frame rate of the video signal received by the image transmission device 100 changes from 30/1.001 fps to 30 fps, the frequency detector 150 detects that the frame rate of the image frame changes from 30/1.001 fps to 30 fps and outputs the frequency switching mark signal.

For another example, in a case where the frame rate of the video signal received by the image transmission device 100 changes from 60/1.001 fps to 60 fps, the frequency detector 150 detects that the frame rate of the image frame changes from 60/1.001 fps to 60 fps and outputs the frequency switching mark signal.

As shown in FIG. 3, the frequency configuration device 170 is coupled to the frequency detector 150, and the frequency configuration device 170 is configured to output a first configuration signal according to a safe frequency step value in response to the frequency switching mark signal from the frequency detector 150.

It will be noted that, the "safe frequency step value" refers to a change value that allows a frequency of a reference clock signal to change on a premise of ensuring that the locked state between the image frame transmitter 140 and the image frame receiver 210 is not lost.

It can be understood that, if the change value of the frequency of the reference clock signal is less than or equal to the safe frequency step value, the locked state between the image frame transmitter 140 and the image frame receiver 210 will not be lost; and if the change value of the frequency of the reference clock signal is greater than the safe frequency step value, the locked state between the image frame transmitter 140 and the image frame receiver 210 may be lost.

On a premise of ensuring that the locked state between the image frame transmitter 140 and the image frame receiver 210 is not lost, the greater the safe frequency step value, the better. In this way, it may ensure that the frequency of the reference clock signal may be adjusted to a frequency that matches a changed frame rate as soon as possible by a few adjustments.

The first configuration signal contains the safe frequency step value.

It will be noted that, the safe frequency step value may be a parameter preset and stored in the image transmission device 100. For example, the safe frequency step value is stored in the frequency configuration device 170; or, the safe frequency step value may be generated by a specific functional module provided in the image transmission device 100. The specific functional module is, for example, a frequency step determining device 160 (which will be described below).

As shown in FIG. 3, the frequency processor 180 is coupled to the frequency configuration device 170. The frequency processor 180 is configured to: output a reference clock signal; adjust a frequency of the output reference clock signal repeatedly according to the first configuration signal from the frequency configuration device 170, each adjustment value being less than or equal to the safe frequency step value; and until a frequency of an adjusted reference clock signal is substantially equal to the frequency of the reference clock signal corresponding to the changed frame rate of the image frame, end adjustment.

It will be noted that, the frequency of the reference clock signal corresponding to the frame rate of the image frame is positively correlated with the frame rate of the image frame. That is, as the frame rate of the image frame changes, the frequency of the reference clock signal corresponding to the frame rate of the image frame also changes in a same direction.

After the frequency of the output reference clock signal is adjusted repeatedly, the frequency (hereinafter referred to as a frequency A for ease of description) of the adjusted reference clock signal output by the frequency processor 180 is substantially equal to the frequency (hereinafter referred to as a frequency B for ease of description) of the reference clock signal corresponding to the changed frame rate of the image frame. The expression "the frequency A substantially equal to the frequency B" means that the frequency A is within an acceptable range of deviation of the frequency B.

For example, the frequency of the reference clock signal is an integer multiple of the frame rate of the image frame. For example, the display apparatus 300 is a full high definition (FHD) display apparatus; and a resolution of the display screen 311 in the display device 300 is 1920×1080, or the resolution of the display screen 311 is a multiple of 1920×1080. For example, the resolution of the display screen 311 is 3840×2160; and in this case, the display screen 311 has 2200×1125 pixels, the frame rate of the image frame is 60 fps, and the frequency of the reference clock signal corresponding to the frame rate of the image frame is: 60×2200×1125=148,500,000 Hz, i.e., 148.5 MHz.

For example, the frame rate of the image frame changes from 60 fps to 60/1.001 fps, and then the frequency of the reference clock signal corresponding to 60/1.001 fps is:

$$\frac{148.5}{1.001} \text{MHz} = 148.35 \text{ MHz}.$$

It will be understood that, the frequency processor 180 adjusts the frequency of the output reference clock signal repeatedly according to the first configuration signal provided by the frequency configuration device 170, and each adjustment value for adjusting the frequency of the reference clock signal is less than or equal to the safe frequency step value, which may avoid the loss of the locked state between the image frame transmitter 140 and the image frame receiver 210 caused by a sudden change in the frequency of the reference clock signal.

For example, in a case where the frame rate of the image frame changes from 60 fps to 60/1.001 fps, the frequency processor 180 adjusts the frequency of the output reference clock signal repeatedly, so that the frequency of the reference clock signal is adjusted from 148.5 MHz to 148.35 MHz.

For another example, in a case where the frame rate of the image frame changes from 60/1.001 fps to 60 fps, the frequency processor 180 adjusts the frequency of the output reference clock signal repeatedly, so that the frequency of the reference clock signal is adjusted from 148.35 MHz to 148.5 MHz.

In addition, the safe frequency step value of the image transmission device 100 is less than a difference value between a frequency of a reference clock signal corresponding to a frame rate of the image frame before change and a frequency of a reference clock signal corresponding to the frame rate of the image frame after change. For example, the difference value between frequencies of reference clock signals is: 148.5 MHz−148.35 MHz=0.15 MHz, and the safe frequency step value should be less than 0.15 MHz.

For example, the frequency processor 180 may be a phase-locked loop or a frequency-locked loop.

As shown in FIG. 3, the image frame transmitter 140 is coupled to the frequency processor 180. The image frame transmitter 140 is configured to receive the image frame and the adjusted reference clock signal that is from the frequency processor 180, convert the format of the image frame into a format corresponding to the image frame transmitter 140 according to the adjusted reference clock signal, and output the format-converted image frame.

It will be noted that, according to the foregoing, the image frame transmitter 140 is coupled to the image frame receiver 210, so as to establish the transmission link. Therefore, the "format corresponding to the image frame transmitter 140" means that the format of the image frame after format conversion should conform to the transmission protocol between the image frame transmitter 140 and the image frame receiver 210.

It can be understood that, the image frame transmitter 140 receives the image frame and the adjusted reference clock signal from the frequency processor 180, and the frame rate of the image frame corresponds to the frequency of the adjusted reference clock signal. For example, the image frame transmitter 140 generates a high-speed data transmission clock signal (i.e., a data serial clock) required by the transmission protocol according to the adjusted reference clock signal, and the high-speed data transmission clock signal is used to convert the format of the image frame into the format that conforms to the transmission protocol, so that it is ensured that the image frame transmitter 140 outputs the format-converted image frame to the image frame receiver 210.

In addition, the frequency of the adjusted reference clock signal is an integer multiple of a transmission rate of the image frame between the image frame transmitter 140 and the image frame receiver 210. For example, the frequency of the reference clock signal is twenty times the transmission rate of the image frame between the image frame transmitter 140 and the image frame receiver 210; or the frequency of the reference clock signal is forty times the transmission rate of the image frame between the image frame transmitter 140 and the image frame receiver 210.

For the image transmission device 100 in the embodiments of the present disclosure, the frequency detector 150 outputs the frequency switching mark signal to the frequency configuration device 170 when detecting that the frame rate of the received image frame changes; the frequency configuration device 170 outputs the first configuration signal containing the safe frequency step value that is preset in the image transmission device 100 or generated by the image transmission device 100 to the frequency processor 180, in response to the frequency switching mark signal; the frequency processor 180 adjusts the frequency of the output reference clock signal repeatedly according to the first configuration signal, until the frequency of the output reference clock signal is adjusted to the frequency of the reference clock signal corresponding to the changed frame rate of the image frame, and each adjustment value is less than or equal to the safe frequency step value, which will not cause the sudden change in the frequency of the reference clock signal; and the image frame transmitter 140 converts the format of the image frame into the format corresponding to the image frame transmitter 140 according to the adjusted reference clock signal from the frequency processor 180, so as to ensure a normal transmission of the image frame between the image frame transmitter 140 and the image frame receiver 210. By adjusting the frequency of the output reference clock signal repeatedly, it will not cause the problem of sudden change in the frequency of the reference clock signal, so that the loss of the locked state between the image frame transmitter and the image frame receiver, caused by the disconnection of the transmission link between the image frame transmitter 140 and the image frame receiver 210, is avoided.

In some embodiments, the safe frequency step value may be generated by the specific functional module provided in the image transmission device 100. As shown in FIG. 3, the image transmission device 100 further includes the frequency step determining device 160. The frequency step determining device 160 is coupled to the frequency configuration device 170. The frequency step determining device 160 is configured to: in a safe step determining process, determine the safe frequency step value according to the locking signal for indicating that the image frame transmitter 140 and the image frame receiver 210 are in the locked state, and output the safe frequency step value to the frequency configuration device 170.

It will be noted that the "safe step determining process" refers to a process in which the image transmission device 100 generates the safe frequency step value, i.e., a process in which the frequency step determining device 160 determines the safe frequency step value.

It can be understood that, the frequency step determining device 160 determines the safe frequency step value according to the locking signal for indicating that the image frame transmitter 140 and the image frame receiver 210 are in the locked state, that is, in a case where the transmission link has been established between the image frame receiver 210 and the image transmission device 100, the frequency step determining device 160 determines the safe frequency step value according to the locking signal output by the image frame receiver 210.

It will be noted that, timing of the frequency step determining device 160 outputting the safe frequency step value to the frequency configuration device 170 may be that in a case where the frequency detector 150 detects that the frame rate of the image frame changes, the frequency configuration device 170 sends an obtaining request for the safe frequency step value to the frequency step determining device 160, and the frequency step determining device 160 outputs the safe frequency step value to the frequency configuration device 170 in response to the obtaining request. The timing of the frequency step determining device 160 outputting the safe frequency step value to the frequency configuration device 170 may also be that after obtaining the safe frequency step value in the safe step determining process, the frequency step determining device 160 directly outputs the safe frequency step value to the frequency configuration device 170, so that in a case where the frequency detector 150 detects that the frame rate of the image frame changes, the frequency configuration device 170 may directly output the first configuration signal according to the received safe frequency step value.

In some embodiments, as shown in FIG. 3, in a case where the image transmission device 100 further includes the frequency step determining device 160, when the frequency detector 150 detects that the frame rate of the image frame changes, the frequency configuration device 170 is configured to receive the safe frequency step value from the frequency step determining device 160 in response to the frequency switching mark signal from the frequency detector 150, generate the first configuration signal according to the safe frequency step value, and output the first configuration signal. The frequency processor 180 adjusts the frequency of the output reference clock signal repeatedly according to the first configuration signal from the frequency configuration device 170. As a result, the frequency of the adjusted reference clock signal corresponds to the changed frame rate of the image frame.

Figure 4:
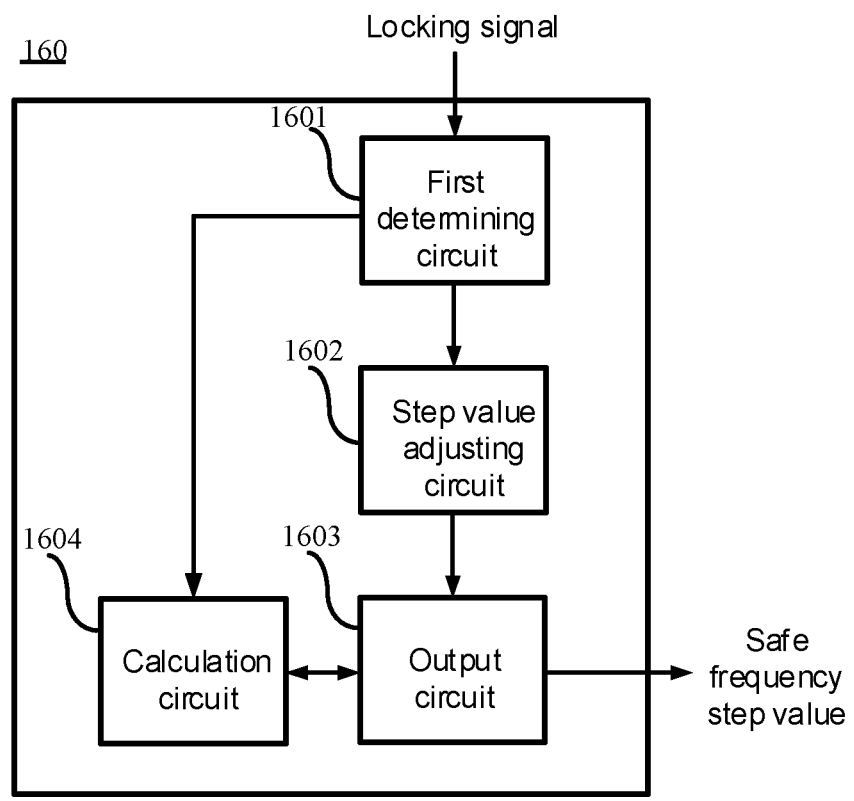
FIG. 4 is a structural diagram of a frequency step determining device of an image transmission device, in accordance with some embodiments.

In some embodiments, as shown in FIG. 4, the frequency step determining device 160 includes a first determining circuit 1601, a step value adjusting circuit 1602, an output circuit 1603, and a calculation circuit 1604.

As shown in FIG. 4, the output circuit 1603 is coupled to the step value adjusting circuit 1602 and the calculation circuit 1604, and is configured to output a frequency step value.

It will be noted that, after the image transmission system 200 is powered on and initialized, the image frame transmitter 140 and the image frame receiver 210 are trained according to the transmission protocol. The image frame transmitter 140 transmits training data to the image frame receiver 210 until the image frame transmitter 140 and the image frame receiver 210 are in the locked state, and the image frame receiver 210 outputs the locking signal. The output circuit 1603 outputs an initial frequency step value to the frequency configuration device 170 in the safe step determining process. The initial frequency step value is used to adjust the frequency of the reference clock signal.

As shown in FIG. 4, the first determining circuit 1601 is configured to: determine whether the locked state between the image frame transmitter 140 and the image frame receiver 210 changes according to the locking signal; determine whether to adjust the frequency step value (e.g., the initial frequency step value) currently output by the output circuit 1603 according to whether the locked state changes; and if it is determined that the frequency step value currently output by the output circuit 1603 needs to be adjusted, output an adjustment instruction signal to the step value adjusting circuit 1602.

The first determining circuit 1601 is further configured to: determine whether the locked state between the image frame transmitter 140 and the image frame receiver 210 changes after the frequency step value currently output by the output circuit 1603 is adjusted, according to the locking signal; continue to determine whether to adjust the adjusted frequency step value output by the output circuit 1603; and until it is determined that an adjusted frequency step value currently output by the output circuit 1603 does not need to be adjusted, output a calculation instruction signal to the calculation circuit 1604.

For example, if the first determining circuit 1601 receives the locking signal within preset time, it is determined that the image frame transmitter 140 and the image frame receiver 210 are in the locked state, and it is determined that the locked state between the image frame transmitter 140 and the image frame receiver 210 does not change. Then, the first determining circuit 1601 determines that the frequency step value currently output by the output circuit 1603 needs to be adjusted, and the first determining circuit 1601 outputs the adjustment instruction signal to the step value adjusting circuit 1602.

After the frequency step value currently output by the output circuit 1603 is adjusted, if the first determining circuit 1601 does not receive the locking signal within the preset time, it is determined that the locked state between the image frame transmitter 140 and the image frame receiver 210 is lost. Then, the first determining circuit 1601 determines that the adjusted frequency step value currently output by the output circuit 1603 does not need to be adjusted, and outputs the calculation instruction signal to the calculation circuit 1604.

For example, if the first determining circuit 1601 does not receive the locking signal within the preset time, it is determined that the locked state between the image frame transmitter 140 and the image frame receiver 210 is changed to a state in which the locked state is lost. Then, the first determining circuit 1601 determines that the frequency step value currently output by the output circuit 1603 needs to be adjusted, and outputs the adjustment instruction signal to the step value adjusting circuit 1602.

After the frequency step value currently output by the output circuit 1603 is adjusted, if the first determining circuit 1601 receives the locking signal within the preset time, it is determined that the locked state between the image frame transmitter 140 and the image frame receiver 210 is restored. Then, the first determining circuit 1601 determines that the adjusted frequency step value currently output by the output circuit 1603 does not need to be adjusted, and outputs the calculation instruction signal to the calculation circuit 1604.

It will be noted that, the "preset time" refers to system response time for the image frame transmitter 140 and the image frame receiver 210 to be in the locked state. For example, a duration of the preset time may be two seconds.

As shown in FIG. 4, the step value adjusting circuit 1602 is coupled to the first determining circuit 1601, and is configured to receive the adjustment instruction signal from the first determining circuit 1601, adjust the frequency step value currently output by the output circuit 1603 according to the adjustment instruction signal, and output an adjusted frequency step value to the output circuit 1603.

For example, if the first determining circuit 1601 determines that the locked state between the image frame transmitter 140 and the image frame receiver 210 does not change, the step value adjusting circuit 1602 increases the frequency step value currently output by the output circuit 1603 according to the adjustment instruction signal, and outputs the increased frequency step value to the output circuit 1603.

For example, if the first determining circuit 1601 determines that the locked state between the image frame transmitter 140 and the image frame receiver 210 changes to the state in which the locked state is lost, the step value adjusting circuit 1602 reduces the frequency step value currently output by the output circuit 1603 according to the adjustment instruction signal, and outputs the reduced frequency step value to the output circuit 1603.

As shown in FIG. 4, the output circuit 1603 is further configured to receive the adjusted frequency step value from the step value adjusting circuit 1602, and output the adjusted frequency step value to the frequency configuration device 170.

As shown in FIG. 4, the calculation circuit 1604 is coupled to the first determining circuit 1601 and the output circuit 1603, and is configured to obtain the safe frequency step value through calculation according to the adjusted frequency step value currently output by the output circuit 1603 in response to the calculation instruction signal from the first determining circuit 1601.

It will be noted that, in a case where the step value adjusting circuit 1602 adjusts a frequency step value currently output by the output circuit 1603, and the locked state between the image frame transmitter 140 and the image frame receiver 210 is changed, the frequency step value currently output by the output circuit 1603 is referred to as a "critical frequency step value".

For example, the calculation circuit 1604 subtracts a preset frequency threshold from the critical frequency step value to obtain the safe frequency step value. The "preset frequency threshold" is a preset parameter, and the preset frequency threshold is less than the critical frequency step value. The preset frequency threshold may be in a range from 10 Hz to 1000 Hz. For example, the preset frequency threshold is 10 Hz, 50 Hz, 100 Hz, 500 Hz or 1000 Hz.

In some embodiments, as shown in FIG. 3, the frequency configuration device 170 is further configured to: in the safe step determining process, receive a frequency step value from the output circuit 1603 in the frequency step determining device 160; generate a second configuration signal according to the frequency step value from the output circuit 1603; and output the second configuration signal, so that the frequency processor 180 adjusts a frequency of a reference clock signal currently output according to the second configuration signal received from the frequency configuration device 170. Therefore, through cooperation of the frequency configuration device 170 and the frequency processor 180, the frequency step determining device 160 determines the safe frequency step value.

It will be noted that, according to the foregoing, "the frequency step value from the output circuit 1603 in the frequency step determining device 160" may be the initial frequency step value output by the output circuit 1603 to the frequency configuration device 170 in the safe step determining process, or the adjusted frequency step value from the output circuit 1603 in the safe step determining process.

It will be understood that, the second configuration signal contains the initial frequency step value or the adjusted frequency step value from the output circuit 1603.

As shown in FIG. 3, the frequency processor 180 is further configured to: in the safe step determining process, receive the second configuration signal from the frequency configuration device 170; adjust the frequency of the reference clock signal currently output according to the frequency step value contained in the second configuration signal; and output a reference clock signal with the adjusted frequency.

It will be understood that, the frequency processor 180 adjusts the frequency of the reference clock signal according to the initial frequency step value or the adjusted frequency step value contained in the second configuration signal, and outputs the reference clock signal with the adjusted frequency.

When the image frame transmitter 140 receives the reference clock signal with the adjusted frequency, the image frame transmitter 140 and the image frame receiver 210 may still be in the locked state, or the locked state between the image frame transmitter 140 and the image frame receiver 210 may be changed to the state in which the locked state is lost. In this case, the first determining circuit 1601 in the frequency step determining device 160 determines whether the locked state between the image frame transmitter 140 and the image frame receiver 210 changes according to the locking signal, and outputs the adjustment instruction signal to the step value adjusting circuit 1602 according to a determination result, so that the step value adjusting circuit 1602 adjusts a frequency step value currently output by the output circuit 1603 and repeat an adjustment process until the locked state between the image frame transmitter 140 and the image frame receiver 210 is lost or restored. The first determining circuit 1601 outputs the calculation instruction signal to the calculation circuit 1604, and the calculation circuit 1604 calculates the safe frequency step value according to a frequency step value currently output by the output circuit 1603.

In some examples, the difference value between the frequency of the reference clock signal corresponding to the frame rate of the image frame before change and the frequency of the reference clock signal corresponding to the frame rate of the image frame after change is an integer multiple of the safe frequency step value, and the frequency configuration device 170 formulates an adjustment strategy according to a quotient of the difference value between the frequencies of the reference clock signals divided by the safe frequency step value. In some other examples, the difference value between the frequency of the reference clock signal corresponding to the frame rate of the image frame before change and the frequency of the reference clock signal corresponding to the frame rate of the image frame after change is not an integer multiple of the safe frequency step value, and the frequency configuration device 170 formulates an adjustment strategy according to a quotient and a remainder of the difference value between the frequencies of the reference clock signals divided by the safe frequency step value.

Figure 5:
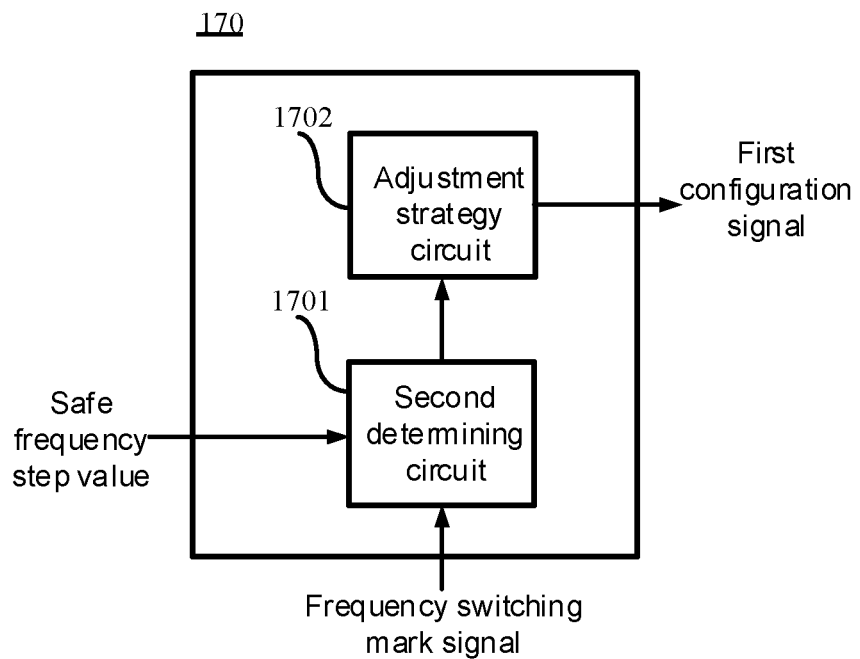
FIG. 5 is a structural diagram of a frequency configurator of an image transmission device, in accordance with some embodiments.

In some embodiments, as shown in FIG. 5, the frequency configuration device 170 includes a second determining circuit 1701 and an adjustment strategy circuit 1702.

As shown in FIG. 5, the second determining circuit 1701 is configured to calculate the difference value between the frequency of the reference clock signal corresponding to the frame rate of the image frame before change and the frequency of the reference clock signal corresponding to the frame rate of the image frame after change in response to the frequency switching mark signal, and determine whether the difference value is the integer multiple of the safe frequency step value.

It will be understood that, in a case where the frequency detector 150 detects that the frame rate of the image frame changes, the second determining circuit 1701 calculates the difference value between the frequency of the reference clock signal corresponding to the frame rate of the image frame before change and the frequency of the reference clock signal corresponding to the frame rate of the image frame after change in response to the frequency switching mark signal received from the frequency detector 150; and the second determining circuit 1701 receives the safe frequency step value from the frequency step determining device 160, and determines whether the difference value between the frequencies of the reference clock signals is the integer multiple of the safe frequency step value.

As shown in FIG. 5, the adjustment strategy circuit 1702 is coupled to the second determining circuit 1701. The adjustment strategy circuit 1702 is configured to: output a first configuration signal containing the safe frequency step value and a first number of adjustments in a case where the difference value between the frequency of the reference clock signal corresponding to the frame rate of the image frame before change and the frequency of the reference clock signal corresponding to the frame rate of the image frame after change is the integer multiple of the safe frequency step value, the first number of adjustments being equal to the quotient of the difference value divided by the safe frequency step value, and output a first configuration signal containing the safe frequency step value, a second number of adjustments and a remainder step value in a case where the difference value between the frequencies of the reference clock signals is not the integer multiple of the safe frequency step value, the second number of adjustments being equal to the quotient of the difference value divided by the safe frequency step value, and the remainder step value being equal to the remainder of the difference value divided by the safe frequency step value.

In some embodiments, as shown in FIG. 3, the frequency processor 180 is configured to adjust the frequency of the output reference clock signal for the first number of adjustments according to the first configuration signal from the frequency configuration device 170, in a case where the difference value between the frequency of the reference clock signal corresponding to the frame rate of the image frame before change and the frequency of the reference clock signal corresponding to the frame rate of the image frame after change is the integer multiple of the safe frequency step value. Each adjustment value is equal to the safe frequency step value.

The frequency processor 180 adjusts the frequency of the reference clock signal, and thus the adjusted frequency of the reference clock signal may be equal to the frequency of the reference clock signal corresponding to the changed frame rate of the image frame.

In a case where the difference value between the frequency of the reference clock signal corresponding to the frame rate of the image frame before change and the frequency of the reference clock signal corresponding to the frame rate of the image frame after change is not the integer multiple of the safe frequency step value, the frequency processor 180 adjusts the frequency of the output reference clock signal (M+1) times according to the first configuration signal received from the frequency configuration device 170. Here, each adjustment value of M times of adjustments in (M+1) times of adjustments is equal to the safe frequency step value, an adjustment value of the remaining one adjustment in (M+1) times of adjustments is equal to the remainder step value, and M is equal to the second number of adjustments.

The frequency processor 180 adjusts the frequency of the reference clock signal, and thus the adjusted frequency of the reference clock signal may be equal to the frequency of the reference clock signal corresponding to the changed frame rate of the image frame.

It will be noted that, one adjustment using the remainder step value may be performed after the M adjustments, i.e., a last adjustment in M+1 adjustments, or may be performed between any two adjustments in the M adjustments.

In some embodiments, as shown in FIG. 3, the image transmission device 100 further includes a video input interface 110, an image buffer 120 and an image converter 130.

The video input interface 110 is configured to receive a video signal from the outside and convert the received video signal into an image frame.

For example, the video input interface 110 receives the video signal from the outside, and converts the video signal conforming to an interface protocol (e.g., a high definition multimedia interface (HDMI) protocol, a DisplayPort (DP) protocol, or a serial digital interface (SDI) protocol) into the image frame.

As shown in FIG. 3, the image buffer 120 is coupled to the video input interface 110. The image buffer 120 is configured to: receive the image frame from the video input interface 110 and buffer the image frame; and adjust a frame rate of the received image frame to correspond to a frequency of a reference clock signal currently output by the frequency processor 180 in a process of adjusting the frequency of the output reference clock signal repeatedly by the frequency processor 180.

For example, as shown in FIG. 3, the image transmission device 100 further includes a double data rate synchronous dynamic random-access memory (DDR SDRAM or DDR for short) coupled to the image buffer 120, and the DDR is used to store the image frame from the image buffer 120, so as to increase storage space of the image transmission device 100.

It will be understood that, in a process in which the frequency detector 150 detects that the frame rate of the image frame changes, and the frequency processor 180 adjusts the frequency of the output reference clock signal repeatedly, a frequency of a reference clock signal currently output by the frequency processor 180 changes after each adjustment. The image buffer 120 may, according to the number of buffered image frames, insert a frame into or delete a frame from the image frames, and adjust the frame rate of the received image frame to correspond to the frequency of the reference clock signal currently output by the frequency processor 180, so as to ensure the normal transmission of the image frame between the image frame transmitter 140 and the image frame receiver 210.

It will be noted that, inserting the frame into or deleting the frame from the image frames may be copying an image frame and inserting the copied image frame, or may be inserting an image frame that is calculated by using a motion compensation.

For example, the frame rate of the image frame changes from 60/1.001 fps to 60 fps, and one frame needs to be inserted into the image frames every sixteen seconds.

As shown in FIG. 3, the image converter 130 is coupled to the image buffer 120 and the image frame transmitter 140, and is configured to receive the image frame, perform an image processing on the image frame, and output an image frame that is obtained after the image processing to the image frame transmitter 140.

It will be noted that, the image frame transmitter 140 generates a high-speed data transmission clock signal and a video clock signal (e.g., data parallel clock) according to the reference clock signal, and outputs the video clock signal to the image converter 130. The image converter 130 performs beating on the image frame from the image buffer 120 according to the video clock signal, so as to read the image frame.

For example, the image processing performed by the image converter 130 on the image frame includes a dividing process. The dividing process means that: the display screen 311 in the display module 310 is divided into regions, and the image frame is sent to each divided region of the display screen 311, so that an image of the image frame is displayed on each divided region of the display screen 311; or, an image of the image frame is divided, the display screen 311 in the display module 310 is divided into regions, and each divided image of the image frame is sent to each divided region, so that images displayed on the divided regions of the display screen 311 are spliced into the image of the image frame.

For example, the image processing performed by the image converter 130 on the image frame includes a color format conversion. For example, an image frame in an RGB format is converted into an image frame in a YUV format.

In some embodiments, as shown in FIG. 2, the image transmission device 100 in the above embodiments is disposed in the system board 320 in the display apparatus 300, and the image frame receiver 210 in the image transmission system 200 is disposed in the control circuit board 312 in the display apparatus 300, which ensures a stable installation of the image transmission device 100 and the image frame receiver 210, and facilitate coupling and establishing the transmission link between the image frame transmitter 140 in the image transmission device 100 and the image frame receiver 210.

Based on this, embodiments of the present disclosure further provide a control method of an image transmission device, which is applied to the image transmission device 100 described in any of the above embodiments. The control method of the image transmission device 100 includes a frequency adjustment process, and the frequency adjustment process is a process in a case where the frame rate of the video signal received by the image transmission device 100 changes.

Figure 6A:
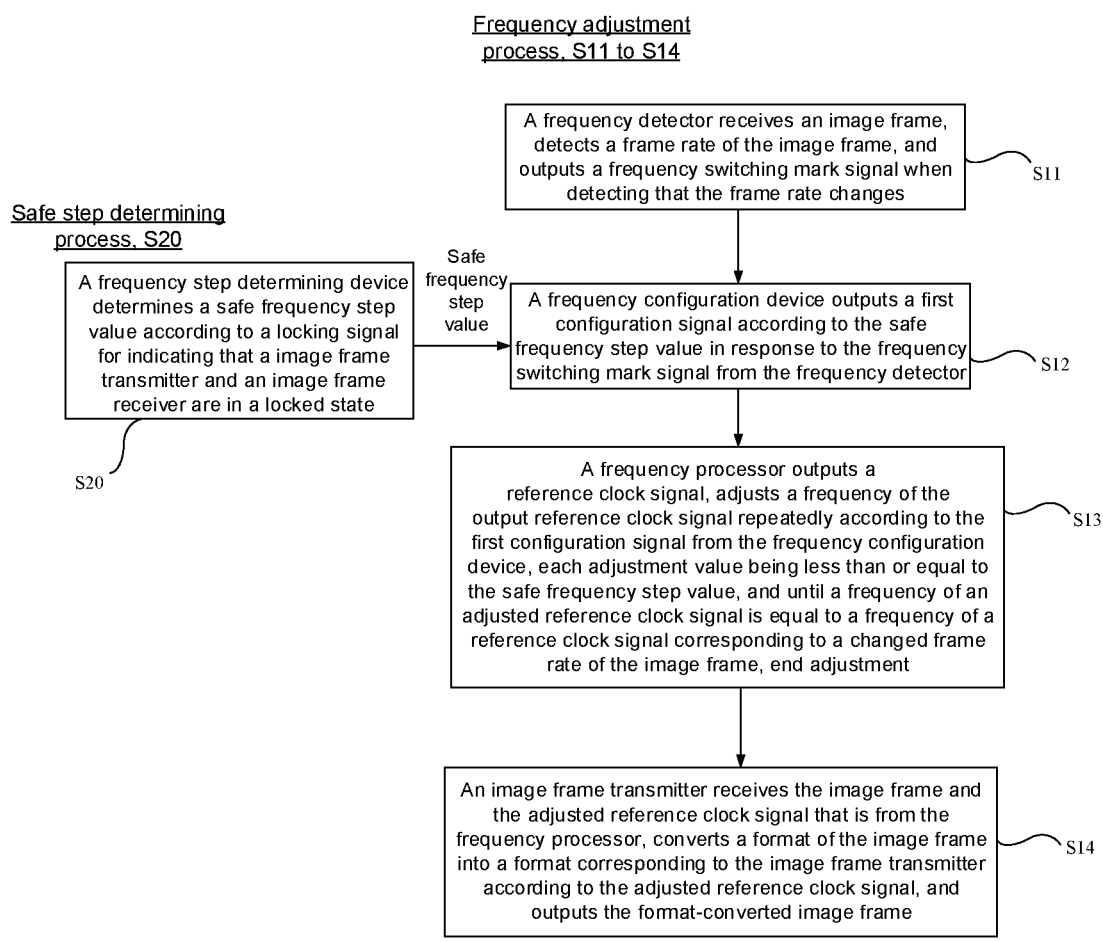
FIG. 6A is a flow diagram of a frequency adjustment process in a control method of an image transmission device, in accordance with some embodiments.

As shown in FIG. 6A, the frequency adjustment process includes the following steps 11 to 14 (S11 to S14).

In S11, the frequency detector 150 receives the image frame, detects the frame rate of the image frame, and outputs the frequency switching mark signal when detecting that the frame rate changes.

It will be understood that, in a case where the frame rate of the video signal received by the image transmission device 100 changes, the frequency detector 150 detects a same change in the frame rate of the image frame and outputs the frequency switching mark signal.

In a case where the frame rate of the video signal received by the image transmission device 100 changes from x fps to x/1.001 fps, the frequency detector 150 detects that the frame rate of the image frame changes from x fps to x/1.001 fps and outputs the frequency switching mark signal.

For example, in a case where the frame rate of the video signal received by the image transmission device 100 changes from 30 fps to 60/1.001 fps, the frequency detector 150 detects that the frame rate of the image frame changes from 30 fps to 30/1.001 fps and outputs the frequency switching mark signal.

For another example, in a case where the frame rate of the video signal received by the image transmission device 100 changes from 60 fps to 60/1.001 fps, the frequency detector 150 detects that the frame rate of the image frame changes from 60 fps to 60/1.001 fps and outputs the frequency switching mark signal.

In a case where the frame rate of the video signal received by the image transmission device 100 changes from x/1.001 fps to x fps, the frequency detector 150 detects that the frame rate of the image frame changes from x/1.001 fps to x fps and outputs the frequency switching mark signal.

For example, in a case where the frame rate of the video signal received by the image transmission device 100 changes from 60/1.001 fps to 30 fps, the frequency detector 150 detects that the frame rate of the image frame changes from 30/1.001 fps to 30 fps and outputs the frequency switching mark signal.

For another example, in a case where the frame rate of the video signal received by the image transmission device 100 changes from fps to 60/1.001 fps, the frequency detector 150 detects that the frame rate of the image frame changes from 60/1.001 fps to 60 fps and outputs the frequency switching mark signal.

In S12, the frequency configuration device 170 outputs the first configuration signal according to the safe frequency step value in response to the frequency switching mark signal received from the frequency detector 150.

It will be noted that, the safe frequency step value is a parameter preset in the image transmission device 100 or generated by the image transmission device 100, and the frequency configuration device 170 outputs the first configuration signal containing the safe frequency step value in response to the frequency switching mark signal received from the frequency detector 150.

In S13, the frequency processor 180 outputs the reference clock signal, and adjusts the frequency of the output reference clock signal repeatedly according to the first configuration signal from the frequency configuration device 170, each adjustment value being less than or equal to the safe frequency step value; and until a frequency of an adjusted reference clock signal is equal to the frequency of the reference clock signal corresponding to the changed frame rate of the image frame, ends adjustment.

It will be understood that, the frequency processor 180 adjusts the frequency of the reference clock signal output by the frequency processor 180 repeatedly according to the first configuration signal provided by the frequency configuration device 170. If each adjustment value for adjusting the frequency of the reference clock signal is less than or equal to the safe frequency step value, the locked state between the image frame transmitter 140 and the image frame receiver 210 is not lost; and if each adjustment value for adjusting the frequency of the reference clock signal is greater than the safe frequency step value, the locked state between the image frame transmitter 140 and the image frame receiver 210 may be lost.

In addition, the safe frequency step value preset in the image transmission device 100 or generated by the image transmission device 100 is less than the difference value between the frequency of the reference clock signal corresponding to the frame rate of the image frame before change and the frequency of the reference clock signal corresponding to the frame rate of the image frame after change. Each adjustment value for adjusting the frequency of the reference clock signal by the frequency processor 180 is less than or equal to the safe frequency step value, which may avoid a sudden change in the frequency of the reference clock signal. For example, in a case where the frame rate of the image frame changes from 60 fps to 60/1.001 fps, the difference value between the frequencies of the reference clock signals is: 148.5 MHz−148.35 MHz=0.15 MHz; and the safe frequency step value is less than 0.15 MHz.

In S14, the image frame transmitter 140 receives the image frame and the adjusted reference clock signal that is from the frequency processor 180, converts the format of the image frame into the format corresponding to the image frame transmitter 140 according to the adjusted reference clock signal, and outputs the format-converted image frame.

It can be understood that, the image frame transmitter 140 receives the image frame and the adjusted reference clock signal from the frequency processor 180, and the frame rate of the image frame corresponds to the frequency of the adjusted reference clock signal. For example, the image frame transmitter 140 generates a high-speed data transmission clock signal (i.e., a data serial clock) required by the transmission protocol between the image frame transmitter 140 and the image frame receiver 210 according to the adjusted reference clock signal, the high-speed data transmission clock signal is used to convert the format of the image frame into the format that conforms to the transmission protocol, and thus the image frame transmitter 140 outputs the format-converted image frame to the image frame receiver 210.

For the control method in the embodiments of the present disclosure, the frequency detector 150 outputs the frequency switching mark signal to the frequency configuration device 170 when detecting that the frame rate of the received image frame changes; the frequency configuration device 170 outputs the first configuration signal containing the safe frequency step value that is preset in the image transmission device 100 or generated by the image transmission device 100 to the frequency processor 180, in response to the frequency switching mark signal; the frequency processor 180 adjusts the frequency of the output reference clock signal repeatedly according to the first configuration signal, until the frequency of the adjusted reference clock signal is the frequency of the reference clock signal corresponding to the changed frame rate of the image frame, and each adjustment value is less than or equal to the safe frequency step value, which will not cause the sudden change in the frequency of the reference clock signal; and the image frame transmitter 140 converts the format of the image frame into the format corresponding to the image frame transmitter 140 according to the adjusted reference clock signal from the frequency processor 180, so as to ensure the normal transmission of the image frame between the image frame transmitter 140 and the image frame receiver 210. By adjusting the frequency of the reference clock signal repeatedly, it will not cause the problem of the sudden change in the frequency of the reference clock signal, so that the disconnection of the transmission link between the image frame transmitter 140 and the image frame receiver 210 is avoided.

The safe frequency step value may be preset and stored in the image transmission device 100. For example, the safe frequency step value is stored in the frequency configuration device 170. The safe frequency step value may also be generated by the following method.

In some embodiments, the image transmission device 100 further includes the frequency step determining device 160. The control method of the image transmission device 100 further includes a safe step determining process, and the safe step determining process includes step 20 (S20).

In S20, the frequency step determining device 160 determines the safe frequency step value according to a locking signal for indicating that the image frame transmitter 140 and the image frame receiver 210 are in the locked state.

It will be noted that the "safe step determining process" refers to a process in which the image transmission device 100 presets and generates the safe frequency step value, i.e., a process in which the frequency step determining device 160 determines the safe frequency step value.

It can be understood that, the frequency step determining device 160 determines the safe frequency step value according to the locking signal for indicating that the image frame transmitter 140 and the image frame receiver 210 are in the locked state. That is, in a case where the transmission link has been established between the image frame receiver 210 and the image frame transmitter 140, the frequency step determining device 160 determines the safe frequency step value according to the locking signal output by the image frame receiver 210.

Figure 7:
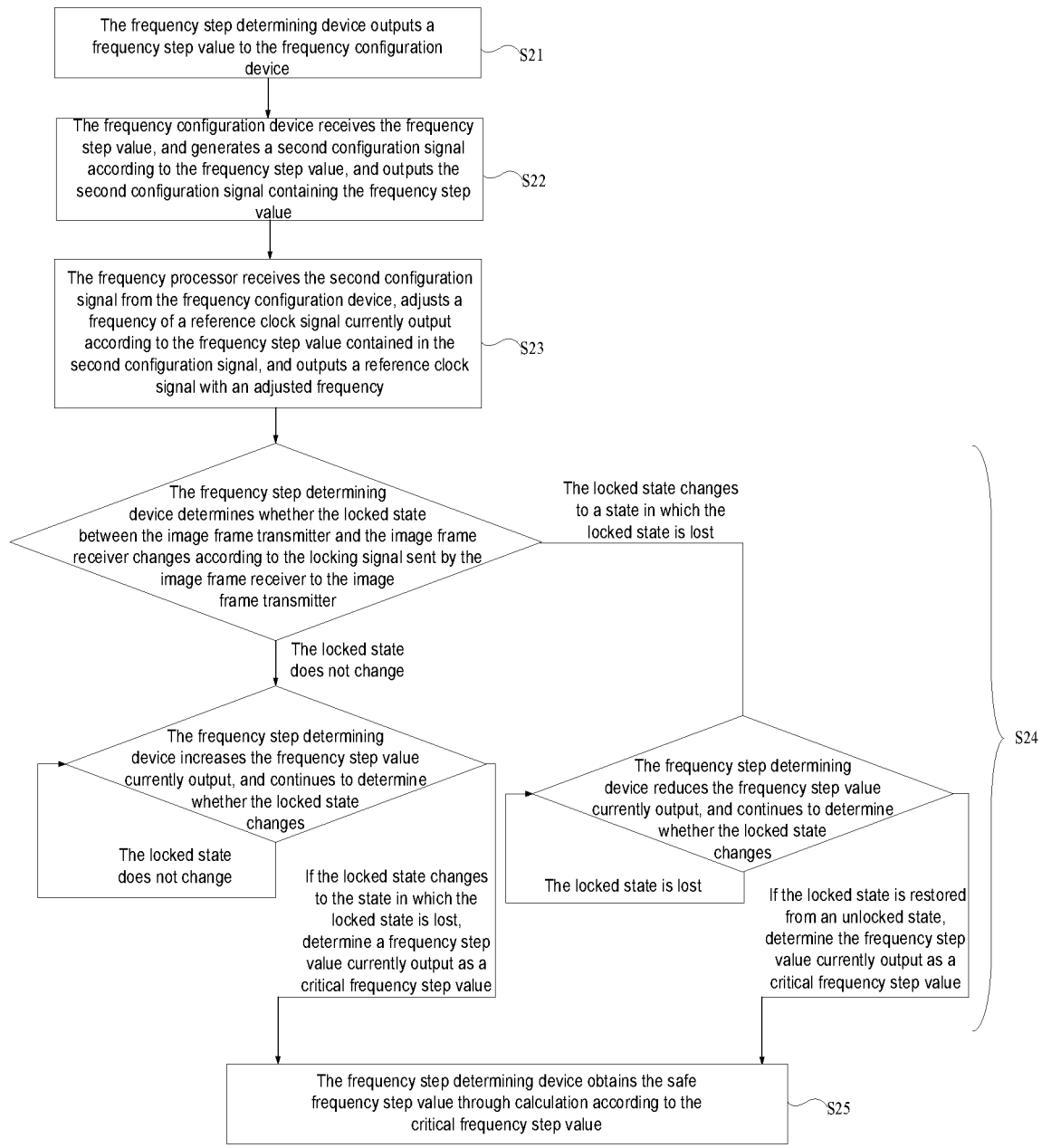
FIG. 7 is a flow diagram of a safe step determining process in a control method of an image transmission device, in accordance with some embodiments.

In some embodiments, as shown in FIG. 7, the frequency step determining device 160 determining the safe frequency step value according to the locking signal for indicating that the image frame transmitter 140 and the image frame receiver 210 are in the locked state in S20, includes steps 21 to 25 (S21 to S25).

After the image transmission system 200 is powered on and initialized, the image frame transmitter 140 and the image frame receiver 210 are trained according to the transmission protocol to be in the locked state, and the image frame receiver 210 outputs the locking signal.

In S21, the frequency step determining device 160 outputs a frequency step value (e.g., an initial frequency step value) to the frequency configuration device 170 in the safe step determining process.

In S22, the frequency configuration device 170 receives the frequency step value, generates a second configuration signal according to the frequency step value, and outputs the second configuration signal containing the frequency step value.

In S23, the frequency processor 180 receives the second configuration signal from the frequency configuration device 170, adjusts a frequency of a reference clock signal currently output according to the frequency step value contained in the second configuration signal, and outputs a reference clock signal with an adjusted frequency.

It will be understood that, when the frequency processor 180 outputs the reference clock signal with the adjusted frequency, the image frame transmitter 140 and the image frame receiver 210 may still be in the locked state, or the locked state therebetween may be changed to a state in which the locked state is lost.

In S24, the frequency step determining device 160 determines whether the locked state between the image frame transmitter 140 and the image frame receiver 210 changes according to the locking signal sent by the image frame receiver 210 to the image frame transmitter 140.

If it is determined that the locked state does not change, the frequency step determining device 160 increases the frequency step value currently output, continues to determine whether the locked state changes, and until it is determined that the locked state is lost, determines a frequency step value currently output as a critical frequency step value.

If the locked state changes to the state in which the locked state is lost, the frequency step determining device 160 reduces the frequency step value currently output, continues to determine whether the locked state is restored from the unlocked state, and until it is determined that the locked state is restored, determines a frequency step value currently output as the critical frequency step value.

For example, determining, by the frequency step determining device 160, whether the locked state between the image frame transmitter 140 and the image frame receiver 210 changes according to the locking signal sent by the image frame receiver 210 to the image frame transmitter 140 includes:

if the frequency step determining device 160 receives the locking signal within preset time, it is determined that the image frame transmitter 140 and the image frame receiver 210 are in the locked state, and it is determined that the locked state between the image frame transmitter 140 and the image frame receiver 210 does not change; and if the frequency step determining device 160 does not receive the locking signal within the preset time, it is determined that the locked state between the image frame transmitter 140 and the image frame receiver 210 is changed to the state in which the locked state is lost.

In S25, the frequency step determining device 160 obtains the safe frequency step value through calculation according to the critical frequency step value. For example, the frequency step determining device 160 subtracts a preset frequency threshold from the critical frequency step value to obtain the safe frequency step value. The "preset frequency threshold" is a parameter preset in the frequency step determining device 160 or generated by the frequency step determining device 160, and the preset frequency threshold is less than the critical frequency step value.

In some examples, the difference value between the frequency of the reference clock signal corresponding to the frame rate of the image frame before change and the frequency of the reference clock signal corresponding to the frame rate of the image frame after change is an integer multiple of the safe frequency step value, and the frequency configuration device 170 formulates an adjustment strategy according to a quotient of the difference value between the frequencies of the reference clock signals divided by the safe frequency step value. In some other examples, the difference value between the frequency of the reference clock signal corresponding to the frame rate of the image frame before change and the frequency of the reference clock signal corresponding to the frame rate of the image frame after change is not the integer multiple of the safe frequency step value, and the frequency configuration device 170 formulates an adjustment strategy according to a quotient and a remainder of the difference value between the frequencies of the reference clock signals divided by the safe frequency step value.

Figure 6B:
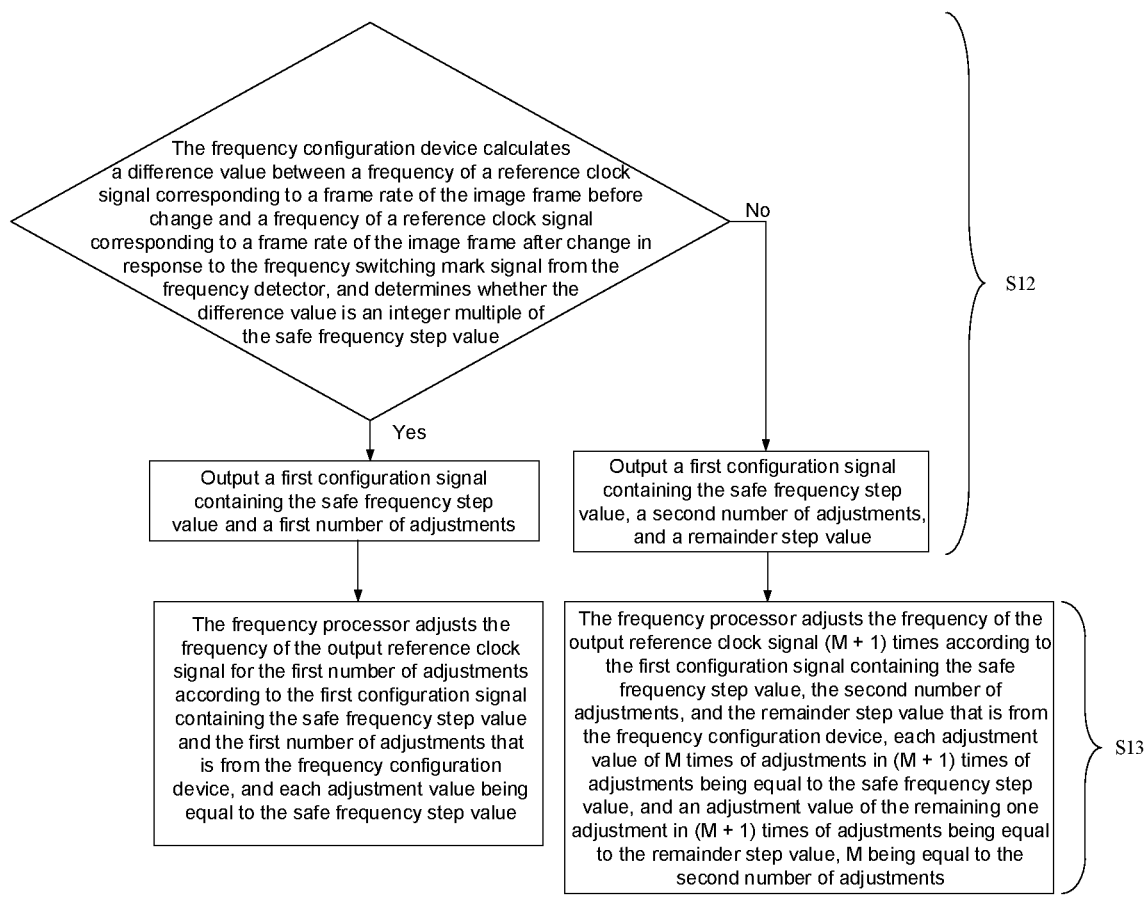
FIG. 6B is a flow diagram of another frequency adjustment process in a control method of an image transmission device, in accordance with some embodiments.

In some embodiments, in the frequency adjustment process, as shown in FIG. 6B, outputting, by the frequency configuration device 170, the first configuration signal according to the safe frequency step value in response to the frequency switching mark signal from the frequency detector 150 in S12, includes:

calculating, by the frequency configuration device 170, the difference value between the frequency of the reference clock signal corresponding to the frame rate of the image frame before change and the frequency of the reference clock signal corresponding to the frame rate of the image frame after change in response to the frequency switching mark signal; and determining, by the frequency configuration device 170, whether the difference value is the integer multiple of the safe frequency step value;

if the difference value is the integer multiple of the safe frequency step value, outputting, by the frequency configuration device 170, a first configuration signal containing the safe frequency step value and a first number of adjustments, the first number of adjustments being equal to the quotient of the difference value divided by the safe frequency step value; and if the difference value is not the integer multiple of the safe frequency step value, outputting, by the frequency configuration device 170, a first configuration signal containing the safe frequency step value, a second number of adjustments, and a remainder step value, the second number of adjustments being equal to the quotient of the difference value divided by the safe frequency step value, and the remainder step value being equal to the remainder of the difference value divided by the safe frequency step value.

In some embodiments, in the frequency adjustment process, as shown in FIG. 6B, the frequency processor 180 outputting the reference clock signal, and adjusting the frequency of the output reference clock signal repeatedly according to the first configuration signal from the frequency configuration device 170, each adjustment value being less than or equal to the safe frequency step value, and until a frequency of an adjusted reference clock signal is equal to the frequency of the reference clock signal corresponding to the changed frame rate of the image frame, ending the adjustment in S13, includes:

if the difference value between the frequency of the reference clock signal corresponding to the frame rate of the image frame before change and the frequency of the reference clock signal corresponding to the frame rate of the image frame after change is the integer multiple of the safe frequency step value, adjusting, by the frequency processor 180, the frequency of the output reference clock signal for the first number of adjustments according to the first configuration signal containing the safe frequency step value and the first number of adjustments that is from the frequency configuration device 170, each adjustment value being equal to the safe frequency step value, and if the difference value between the frequency of the reference clock signal corresponding to the frame rate of the image frame before change and the frequency of the reference clock signal corresponding to the frame rate of the image frame after change is not the integer multiple of the safe frequency step value, adjusting, by the frequency processor 180, the frequency of the output reference clock signal (M+1) times according to the first configuration signal containing the safe frequency step value, the second number of adjustments and the remainder step value that is from the frequency configuration device, each adjustment value of M times of adjustments in (M+1) times of adjustments being equal to the safe frequency step value, an adjustment value of the remaining one adjustment in (M+1) times of adjustments being equal to the remainder step value, and M being equal to the second number of adjustments.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An image transmission device, comprising:
a frequency detector configured to receive an image frame, detect a frame rate of the image frame, and output a frequency switching mark signal when it is detected that the frame rate changes;
a frequency configuration device coupled to the frequency detector, and configured to output a first configuration signal according to a safe frequency step value in response to the frequency switching mark signal from the frequency detector;
a frequency processor coupled to the frequency configuration device, and configured to: output a reference clock signal; adjust a frequency of the output reference clock signal repeatedly according to the first configuration signal from the frequency configuration device, each adjustment value being less than or equal to the safe frequency step value; and until a frequency of an adjusted reference clock signal is substantially equal to a frequency of a reference clock signal corresponding to a changed frame rate of the image frame, end adjustment; and
an image frame transmitter coupled to the frequency processor, and configured to receive the image frame and the adjusted reference clock signal that is from the frequency processor, convert a format of the image frame into a format corresponding to the image frame transmitter according to the adjusted reference clock signal, and output the format-converted image frame.

2. The image transmission device according to claim 1, further comprising: a frequency step determining device coupled to the frequency configuration device, and configured to: in a safe step determining process, determine the safe frequency step value according to a locking signal for indicating that the image frame transmitter and an image frame receiver are in a locked state; and output the safe frequency step value to the frequency configuration device.

3. The image transmission device according to claim 2, wherein the frequency configuration device is configured to receive the safe frequency step value from the frequency step determining device in response to the frequency switching mark signal from the frequency detector, generate the first configuration signal according to the safe frequency step value, and output the first configuration signal.

4. The image transmission device according to claim 3, wherein the frequency step determining device includes: a first determining circuit, a step value adjusting circuit, an output circuit and a calculation circuit, wherein
the output circuit is configured to output a frequency step value;
the first determining circuit is configured to: determine whether the locked state between the image frame transmitter and the image frame receiver changes according to the locking signal; determine whether to adjust the frequency step value currently output by the output circuit according to whether the locked state changes; and if it is determined that the frequency step value currently output by the output circuit is to be adjusted, output an adjustment instruction signal to the step value adjusting circuit;
the step value adjusting circuit is configured to receive the adjustment instruction signal from the first determining circuit, adjust the frequency step value currently output by the output circuit according to the adjustment instruction signal, and output an adjusted frequency step value to the output circuit;
the output circuit is further configured to receive the adjusted frequency step value from the step value adjusting circuit, and output the adjusted frequency step value to the frequency configuration device;
the first determining circuit is further configured to: determine whether the locked state between the image frame transmitter and the image frame receiver changes after the frequency step value currently output by the output circuit is adjusted, according to the locking signal; continue to determine whether to adjust the adjusted frequency step value output by the output circuit; and until it is determined that an adjusted frequency step value currently output by the output circuit is not to be adjusted, output a calculation instruction signal to the calculation circuit; and
the calculation circuit is configured to obtain the safe frequency step value through calculation according to the adjusted frequency step value currently output by the output circuit in response to the calculation instruction signal from the first determining circuit.

5. The image transmission device according to claim 2, wherein the frequency step determining device includes: a first determining circuit, a step value adjusting circuit, an output circuit and a calculation circuit, wherein
the output circuit is configured to output a frequency step value;
the first determining circuit is configured to: determine whether the locked state between the image frame transmitter and the image frame receiver changes according to the locking signal; determine whether to adjust the frequency step value currently output by the output circuit according to whether the locked state changes; and if it is determined that the frequency step value currently output by the output circuit is to be adjusted, output an adjustment instruction signal to the step value adjusting circuit;
the step value adjusting circuit is configured to receive the adjustment instruction signal from the first determining circuit, adjust the frequency step value currently output by the output circuit according to the adjustment instruction signal, and output an adjusted frequency step value to the output circuit;
the output circuit is further configured to receive the adjusted frequency step value from the step value adjusting circuit, and output the adjusted frequency step value to the frequency configuration device;
the first determining circuit is further configured to: determine whether the locked state between the image frame transmitter and the image frame receiver changes after the frequency step value currently output by the output circuit is adjusted, according to the locking signal; continue to determine whether to adjust the adjusted frequency step value output by the output circuit; and until it is determined that an adjusted frequency step value currently output by the output circuit is not to be adjusted, output a calculation instruction signal to the calculation circuit; and
the calculation circuit is configured to obtain the safe frequency step value through calculation according to the adjusted frequency step value currently output by the output circuit in response to the calculation instruction signal from the first determining circuit.

6. The image transmission device according to claim 5, wherein the frequency configuration device is further configured to: in the safe step determining process, receive a frequency step value from the output circuit in the frequency step determining device, generate a second configuration signal according to the frequency step value from the output circuit, and output the second configuration signal; and
the frequency processor is further configured to receive the second configuration signal from the frequency configuration device, adjust a frequency of a reference clock signal currently output according to the frequency step value contained in the second configuration signal, and output a reference clock signal with an adjusted frequency.

7. The image transmission device according to claim 1, wherein the frequency configuration device includes a second determining circuit and an adjustment strategy circuit;
the second determining circuit is configured to calculate a difference value between a frequency of a reference clock signal corresponding to a frame rate of the image frame before change and a frequency of a reference clock signal corresponding to a frame rate of the image frame after change in response to the frequency switching mark signal, and determine whether the difference value is an integer multiple of the safe frequency step value; and
the adjustment strategy circuit is configured to:—
if it is determined that the difference value is the integer multiple of the safe frequency step value, output the first configuration signal containing the safe frequency step value and a first number of adjustments, the first number of adjustments being equal to a quotient of the difference value divided by the safe frequency step value; and
if it is determined that the difference value is not the integer multiple of the safe frequency step value, output the first configuration signal containing the safe frequency step value, a second number of adjustments and a remainder step value, the second number of adjustments being equal to the quotient of the difference value divided by the safe frequency step value, and the remainder step value being equal to a remainder of the difference value divided by the safe frequency step value.

8. The image transmission device according to claim 7, wherein the frequency processor is configured to:—
   if it is determined that the difference value is the integer multiple of the safe frequency step value, adjust the frequency of the output reference clock signal for the first number of adjustments according to the first configuration signal containing the safe frequency step value and the first number of adjustments received from the frequency configuration device, each adjustment value being equal to the safe frequency step value; and
   if it is determined that the difference value is not the integer multiple of the safe frequency step value, adjust the frequency of the output reference clock signal (M+1) times according to the first configuration signal containing the safe frequency step value, the second number of adjustments and the remainder step value received from the frequency configuration device, wherein each adjustment value of M times of adjustments is equal to the safe frequency step value, and an adjustment value of a remaining one adjustment is equal to the remainder step value; and M is equal to the second number of adjustments.

9. The image transmission device according to claim 1, further comprising:
   a video input interface configured to receive a video signal from outside and convert the received video signal into an image frame;
   an image buffer coupled to the video input interface, and configured to: receive the image frame from the video input interface and buffer the image frame received from the video input interface; and adjust a frame rate of the buffered image frame to correspond to a frequency of a reference clock signal currently output by the frequency processor in a process in which the frequency processor adjusts the frequency of the output reference clock signal repeatedly; and
   an image converter coupled to the image buffer and the image frame transmitter, and configured to receive the image frame from the image buffer, perform an image processing on the image frame received from the video input interface, and output an image frame that is obtained after the image processing to the image frame transmitter.

10. An image transmission system, comprising:
    the image transmission device according to claim 1; and
    an image frame receiver configured to establish a transmission link with the image frame transmitter in the image transmission device, receive the format-converted image frame output by the image frame transmitter, and output a locking signal for indicating that the image frame receiver and the image frame transmitter are in a locked state.

11. A display apparatus, comprising the image transmission system according to claim 10.

12. The display apparatus according to claim 11, wherein the display apparatus comprises:
    a display module including a display screen and a control circuit board coupled to the display screen; and
    a system board coupled to the control circuit board, wherein
    the image transmission device in the image transmission system is disposed in the system board, and the image frame receiver in the image transmission system is disposed in the control circuit board.

13. A control method of an image transmission device, applied to the image transmission device according to claim 1, the control method of the image transmission device comprising a frequency adjustment process, the frequency adjustment process including:
    receiving, by the frequency detector, the image frame;
    detecting, by the frequency detector, the frame rate of the image frame;
    outputting, by the frequency detector, the frequency switching mark signal when it is detected that the frame rate changes;
    outputting, by the frequency configuration device, the first configuration signal according to the safe frequency step value in response to the frequency switching mark signal from the frequency detector;
    outputting, by the frequency processor, the reference clock signal;
    adjusting, by the frequency processor, the frequency of the output reference clock signal repeatedly according to the first configuration signal from the frequency configuration device, each adjustment value being less than or equal to the safe frequency step value; and until the frequency of the adjusted reference clock signal is equal to the frequency of the reference clock signal corresponding to the changed frame rate of the image frame, ending the adjustment;
    receiving, by the image frame transmitter, the image frame and the adjusted reference clock signal that is from the frequency processor;
    converting, by the image frame transmitter, the format of the image frame into the format corresponding to the image frame transmitter according to the adjusted reference clock signal; and
    outputting, by the image frame transmitter, the format-converted image frame.

14. The control method according to claim 13, wherein the image transmission device further includes a frequency step determining device, the control method further comprises a safe step determining process, the safe step determining process including:
    determining, by the frequency step determining device, the safe frequency step value according to a locking signal for indicating that the image frame transmitter and an image frame receiver are in a locked state.

15. The control method according to claim 14, wherein determining, by the frequency step determining device, the safe frequency step value according to the locking signal for indicating that the image frame transmitter and the image frame receiver are in the locked state includes:
    outputting, by the frequency step determining device, a frequency step value to the frequency configuration device;
    receiving, by the frequency configuration device, the frequency step value;
    generating, by the frequency configuration device, a second configuration signal according to the frequency step value;
    outputting, by the frequency configuration device, the second configuration signal;
    receiving, by the frequency processor, the second configuration signal from the frequency configuration device;
    adjusting, by the frequency processor, a frequency of a reference clock signal currently output according to the frequency step value contained in the second configuration signal;

outputting, by the frequency processor, a reference clock signal with an adjusted frequency;

determining, by the frequency step determining device, whether the locked state between the image frame transmitter and the image frame receiver changes according to the locking signal sent by the image frame receiver to the image frame transmitter;

if it is determined that the locked state does not change, increasing, by the frequency step determining device, the frequency step value currently output; continuing to determine, by the frequency step determining device, whether the locked state changes; and until it is determined that the locked state is lost, determining, by the frequency step determining device, a frequency step value currently output as a critical frequency step value;

if it is determined that the locked state changes to a state in which the locked state is lost, reducing, by the frequency step determining device, the frequency step value currently output; continuing to determine, by the frequency step determining device, whether the locked state is restored from an unlocked state; and until it is determined that the locked state is restored from the unlocked state, determining, by the frequency step determining device, a frequency step value currently output as the critical frequency step value; and calculating, by the frequency step determining device, the safe frequency step value according to the critical frequency step value.

16. The control method according to claim 15, wherein determining, by the frequency step determining device, whether the locked state between the image frame transmitter and the image frame receiver changes according to the locking signal sent by the image frame receiver to the image frame transmitter includes:

if the frequency step determining device receives the locking signal within preset time, it is determined that the image frame transmitter and the image frame receiver are in the locked state, and it is determined that the locked state between the image frame transmitter and the image frame receiver does not change; and if the frequency step determining device does not receive the locking signal within the preset time, it is determined that the locked state between the image frame transmitter and the image frame receiver is changed to the state in which the locked state is lost.

17. The control method according to claim 16, wherein calculating, by the frequency step determining device, the safe frequency step value according to the critical frequency step value includes:

subtracting, by the frequency step determining device, a preset frequency threshold from the critical frequency step value to obtain the safe frequency step value.

18. The control method according to claim 15, wherein calculating, by the frequency step determining device, the safe frequency step value according to the critical frequency step value includes:

subtracting, by the frequency step determining device, a preset frequency threshold from the critical frequency step value to obtain the safe frequency step value.

19. The control method according to claim 13, wherein outputting, by the frequency configuration device, the first configuration signal according to the safe frequency step value in response to the frequency switching mark signal from the frequency detector includes:

calculating, by the frequency configuration device, a difference value between a frequency of a reference clock signal corresponding to a frame rate of the image frame before change and a frequency of a reference clock signal corresponding to a frame rate of the image frame after change in response to the frequency switching mark signal;

determining, by the frequency configuration device, whether the difference value is an integer multiple of the safe frequency step value;

if it is determined that the difference value is the integer multiple of the safe frequency step value, outputting, by the frequency configuration device, the first configuration signal containing the safe frequency step value and a first number of adjustments, the first number of adjustments being equal to a quotient of the difference value divided by the safe frequency step value; and if it is determined that difference value is not the integer multiple of the safe frequency step value, outputting, by the frequency configuration device, the first configuration signal containing the safe frequency step value, a second number of adjustments and a remainder step value, the second number of adjustments being equal to a quotient of the difference value divided by the safe frequency step value, and the remainder step value being equal to a remainder of the difference value divided by the safe frequency step value.

20. The control method according to claim 13, wherein outputting, by the frequency processor, the reference clock signal, and adjusting, by the frequency processor, the frequency of the output reference clock signal repeatedly according to the first configuration signal from the frequency configuration device, each adjustment value being less than or equal to the safe frequency step value, and until the frequency of the adjusted output reference clock signal is equal to the frequency of the reference clock signal corresponding to the changed frame rate of the image frame, ending the adjustment includes:

if the difference value is the integer multiple of the safe frequency step value, adjusting, by the frequency processor, the frequency of the output reference clock signal for the first number of adjustments according to the first configuration signal containing the safe frequency step value and the first number of adjustments that is from the frequency configuration device, each adjustment value being equal to the safe frequency step value; and if the difference value is not the integer multiple of the safe frequency step value, adjusting, by the frequency processor, the frequency of the output reference clock signal (M+1) times according to the first configuration signal containing the safe frequency step value, the second number of adjustments and the remainder step value that is from the frequency configuration device, each adjustment value of M times of adjustments in (M+1) times of adjustments being equal to the safe frequency step value, an adjustment value of a remaining one adjustment in (M+1) times of adjustments being equal to the remainder step value, and M being equal to the second number of adjustments.

* * * * *